(12) United States Patent
Atkinson et al.

(10) Patent No.: US 11,730,986 B2
(45) Date of Patent: Aug. 22, 2023

(54) STORAGE AND CHARGING SYSTEM FOR HAZARDOUS PRODUCTS

(71) Applicant: E-CELL SECURE, L.L.C., Detroit, MI (US)

(72) Inventors: Dennis Atkinson, Ferndale, MI (US); Ronald Butler, West Bloomfield, MI (US)

(73) Assignee: E-CELL SECURE, L.L.C., Detroit, MI (US)

(*) Notice: Subject to any disclaimer, the term of this patent is extended or adjusted under 35 U.S.C. 154(b) by 766 days.

(21) Appl. No.: 16/682,786

(22) Filed: Nov. 13, 2019

(65) Prior Publication Data

US 2020/0147427 A1 May 14, 2020

Related U.S. Application Data

(60) Provisional application No. 62/760,573, filed on Nov. 13, 2018.

(51) Int. Cl.

| | |
|---|---|
| A62C 2/06 | (2006.01) |
| H02J 7/00 | (2006.01) |
| G08B 21/18 | (2006.01) |
| G08B 7/06 | (2006.01) |
| A62C 37/08 | (2006.01) |
| A62C 3/16 | (2006.01) |
| A62C 37/36 | (2006.01) |
| A62C 37/44 | (2006.01) |
| A62C 35/10 | (2006.01) |
| A62C 3/00 | (2006.01) |

(52) U.S. Cl.
CPC ............... *A62C 2/065* (2013.01); *A62C 3/16* (2013.01); *A62C 35/10* (2013.01); *A62C 37/04* (2013.01); *A62C 37/08* (2013.01); *A62C 37/44* (2013.01); *G08B 7/06* (2013.01); *G08B 21/182* (2013.01); *H02J 7/0042* (2013.01); *A62C 3/002* (2013.01); *A62C 3/14* (2013.01)

(58) Field of Classification Search
CPC .............................. A62C 2/065; H02J 7/0042
USPC ......................................................... 320/107
See application file for complete search history.

(56) References Cited

U.S. PATENT DOCUMENTS

| | | |
|---|---|---|
| 5,016,715 A | 5/1991 | Masio |
| 5,056,603 A | 10/1991 | Parkinson |
| 5,651,821 A | 7/1997 | Uchida |
| 5,990,789 A | 11/1999 | Berman et al. |
| 6,660,972 B1 | 12/2003 | Georgii |
| 6,981,555 B2 | 1/2006 | Smith et al. |
| 7,820,319 B2 | 10/2010 | Mehta et al. |
| 8,733,465 B1 | 5/2014 | Flood et al. |
| 8,863,856 B2 | 10/2014 | Eckholm et al. |
| 9,180,324 B2 | 11/2015 | Burkett |
| 9,233,264 B2 | 1/2016 | Graham et al. |
| 9,248,917 B2 | 2/2016 | Gastonides et al. |
| 9,345,916 B1 | 5/2016 | Kirkbride |

(Continued)

*Primary Examiner* — Suchin Parihar
(74) *Attorney, Agent, or Firm* — Bodman PLC (57) ABSTRACT

A system for storing a hazardous product including a housing unit having an interior volume and a door coupled to the housing unit configured to provide access to the interior volume. The system includes an electrical connection configured to transmit electricity into or out of the interior volume. The system further includes a ventilation system for directing gasses and heat produced during a thermal event out of the interior volume.

25 Claims, 7 Drawing Sheets

(56) References Cited

U.S. PATENT DOCUMENTS

| | | |
|---|---|---|
| 9,415,248 B2 | 8/2016 | Donahue |
| 9,539,448 B2 | 1/2017 | Jung et al. |
| 9,586,067 B1 | 3/2017 | Kirkbride |
| 11,380,943 B2 * | 7/2022 | Wedig ................ H01M 10/482 |
| 2005/0057344 A1 | 3/2005 | Davis |
| 2005/0103391 A1 | 5/2005 | Harvey |
| 2006/0113302 A1 | 6/2006 | Mandava et al. |
| 2009/0014188 A1 | 1/2009 | Hesch et al. |
| 2010/0075213 A1 | 3/2010 | Mehta et al. |
| 2010/0086844 A1 | 4/2010 | Mehta et al. |
| 2010/0273034 A1 | 10/2010 | Hermann et al. |
| 2011/0234058 A1 | 9/2011 | Lee |
| 2012/0039694 A1 | 2/2012 | Suzanne |
| 2012/0308859 A1 | 12/2012 | Hermann et al. |
| 2012/0318921 A1 | 12/2012 | Rohrbach et al. |
| 2013/0087570 A1 | 4/2013 | Ekhtiar et al. |
| 2013/0316198 A1 | 11/2013 | Bandhauer et al. |
| 2014/0186668 A1 | 7/2014 | Jung et al. |
| 2014/0209331 A1 | 7/2014 | Burkett |
| 2015/0017491 A1 | 1/2015 | Specht et al. |
| 2015/0147602 A1 | 5/2015 | Bianchi et al. |
| 2015/0203734 A1 | 7/2015 | Kanae et al. |
| 2016/0059056 A1 | 3/2016 | Hoffman |
| 2016/0176622 A1 | 6/2016 | Vertsteylen et al. |
| 2016/0339281 A1 | 11/2016 | Muenzenberger |
| 2017/0077467 A1 | 3/2017 | Kronke et al. |
| 2017/0120090 A1 | 5/2017 | Magnone et al. |
| 2017/0237054 A1 * | 8/2017 | Mast ................ H01M 50/383 |
| | | 320/107 |
| 2017/0335587 A1 | 11/2017 | Prendergast et al. |
| 2017/0361139 A1 * | 12/2017 | Koreis ................ A62C 3/16 |
| 2018/0026245 A1 | 1/2018 | Page et al. |
| 2019/0044326 A1 | 2/2019 | Williams et al. |
| 2019/0046935 A1 | 2/2019 | Schwartz et al. |
| 2019/0344109 A1 | 11/2019 | Enk |
| 2020/0005956 A1 | 1/2020 | Pennington |
| 2021/0194072 A1 * | 6/2021 | Krois ................ H01M 10/425 |
| 2021/0379428 A1 * | 12/2021 | Tsutsui ................ H01M 10/486 |
| 2022/0158277 A1 * | 5/2022 | Park ................ H01M 10/653 |

* cited by examiner

STORAGE AND CHARGING SYSTEM FOR HAZARDOUS PRODUCTS

CROSS-REFERENCE TO RELATED APPLICATION(S)

This application claims priority to and the benefit of U.S. Provisional Application Ser. No. 62/760,573 filed Nov. 13, 2018, the entire disclosure of which is hereby incorporated by reference.

BACKGROUND

The present disclosure relates generally to a system for storing electronic devices and hazardous products, including, but not limited to, high capacity batteries and electronic devices such as laptop computers and mobile phones.

As high capacity batteries, such as lithium and lithium ion batteries, are used in more and more devices, such as mobile phones and laptop computers, there is a desire to use and charge the batteries within these devices in a variety of locations and situations. However, high capacity batteries pose storage and safety challenges. For example, the high capacity batteries may short out and overheat if their terminals come in contact with metal or other battery terminals. Also, the high capacity batteries present a risks of fire, toxic gas release, and smoke. A large quantity of used batteries in close proximity can cause a chain reaction of battery fires. Thus, storing and transporting a large quantity of high capacity batteries may be problematic, especially where personnel trained in extinguishing fires are not readily available. In marine contexts in particular, quarters are often cramped and people are in close proximity to electronic devices with high capacity batteries, which can create safety concerns. There have been multiple incidences of battery fires on vessels, such as boats and ships, resulting in injuries and deaths of people onboard the vessels.

SUMMARY

This section provides a general summary of the present disclosure and is not a comprehensive disclosure of its full scope or all of its features, aspects, and objectives.

Disclosed herein are implementations of a system for storing a hazardous product in accordance with aspects of the present disclosure. The system includes a housing unit having an interior volume and one or more doors coupled to the housing unit configured to provide access to the interior volume. The system includes an electrical connection configured to transmit electricity into or out of the interior volume. The system further includes a ventilation system for directing gasses and heat produced during a thermal event out of the interior volume.

Also disclosed herein are implementations of a system for storing a hazardous product in accordance with aspects of the present disclosure. The system includes a housing unit having an interior volume and a door coupled to the housing unit configured to provide access to the interior volume of the housing unit. The system includes an electrical connection configured to transmit electricity into or out of the interior volume. The system includes a ventilation system configured to direct gasses and heat produced during a thermal event from the interior volume of the housing unit to outside the housing unit. The system includes a fire suppression system configured to suppress the thermal event the interior volume of the housing unit. The fire suppression system includes a reservoir containing fire suppression materials and tubing placed along an interior wall of the housing unit and in fluid communication with the reservoir. The system includes a sensor for detecting the thermal event. The system further includes an alarm system operatively coupled to the sensor. In response to the detection of the thermal event, the alarm system is configured to provide an alarm.

Also disclosed herein is a system for storing and charging a hazardous product in accordance with aspects of the present disclosure. The system includes a housing unit for receiving the hazardous product. The system include an electrical connection configured to transmit electricity into or out of the interior volume. The system includes an electrical connection control device configured to enable and disable the electrical connection and a memory device for storing instructions and information. The system includes a sensor, an alarm system, a communication system having a GPS, and a fire suppression device operatively coupled to the housing unit. The system includes a processing device operatively coupled to the sensor, the memory device, the alarm system, the communication system, and the fire suppression device. The processing device is configured to execute the instructions to receive the thermal event information from the sensor and to store the thermal event information in the memory device. The processing device is configured to execute the instructions to determine a thermal event based on the thermal event information. In response to the thermal event, the processing device is configured to execute the instructions to activate the alarm system and the fire suppression device. The processing device is configured to execute the instructions to transmit, via the communication system, the thermal event information and a GPS location of the housing unit. The processing device is further configured to execute the instructions to disable the electrical connection.

From the following figures, descriptions, and claims, other technical features may be readily apparent to one skilled in the art.

Before undertaking the DETAILED DESCRIPTION below, it may be advantageous to set forth definitions of certain words and phrases used throughout this patent document. The term "couple" and its derivatives refer to any direct or indirect communication between two or more elements, independent of whether those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or portions thereof adapted for implementation in a suitable computer readable program code. The phrase "computer readable program code" includes any type of computer code, including source code, linked or linkable code, object code, and executable code. The phrase "computer readable medium" includes any type of medium capable of being accessed by a computer, such as read only memory (ROM), solid state device (SSD) memory, random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as to future uses of such defined words and phrases.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

FIGS. 1-6 can include additional and/or fewer components and/or steps in an alternative order and are not limited to those illustrated in this disclosure.

A system for storing hazardous products is shown in FIGS. 1-6. The primary hazardous products contemplated in this disclosure are high capacity batteries containing used lithium and lithium-ion batteries and electronic devices containing used high capacity batteries. New batteries and other desired hazardous products may also be contemplated.

Figure 1:
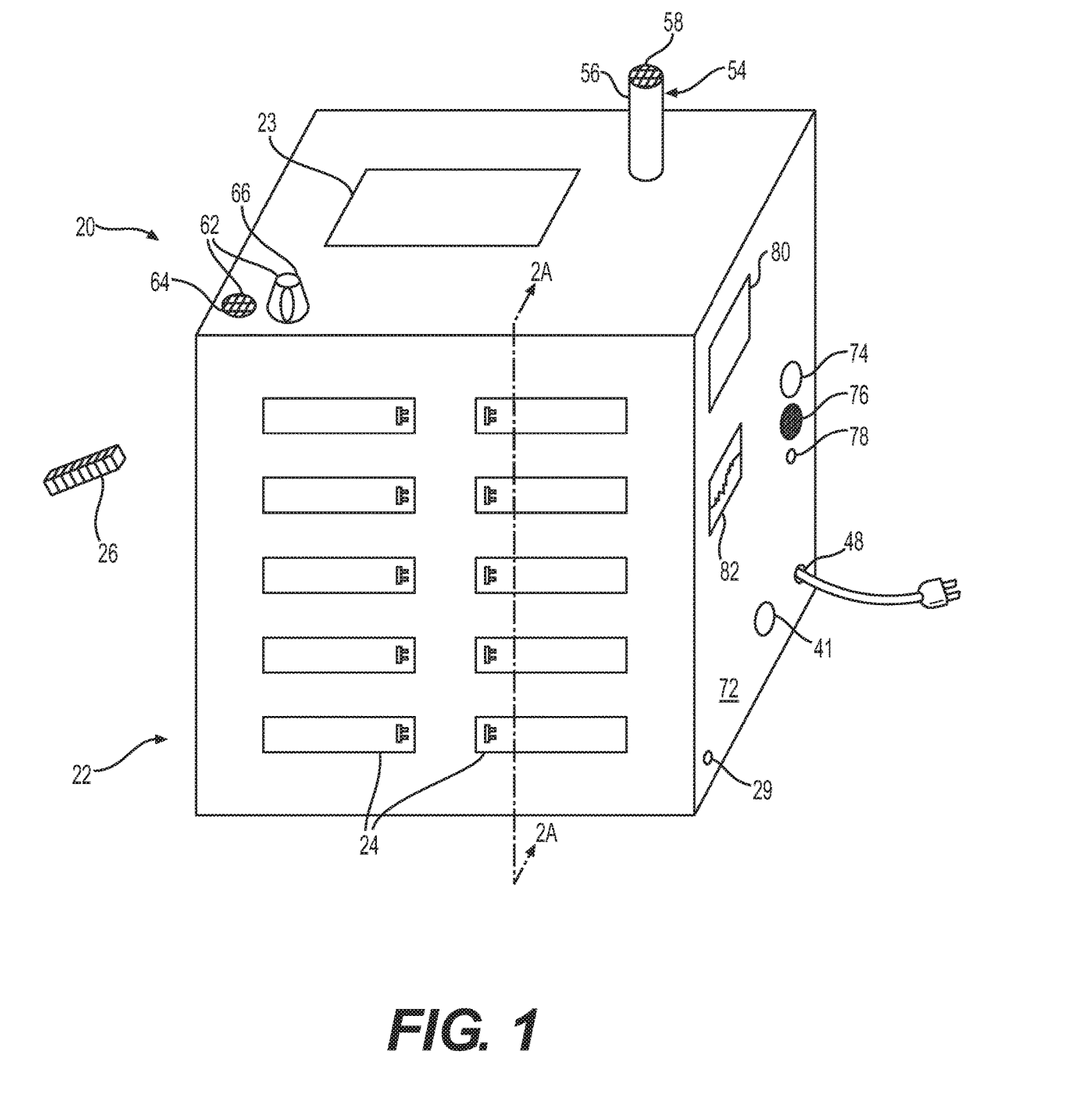
FIG. 1 a perspective view of a system for storing hazardous products in accordance with aspects of the present disclosure.
Figure 2A:
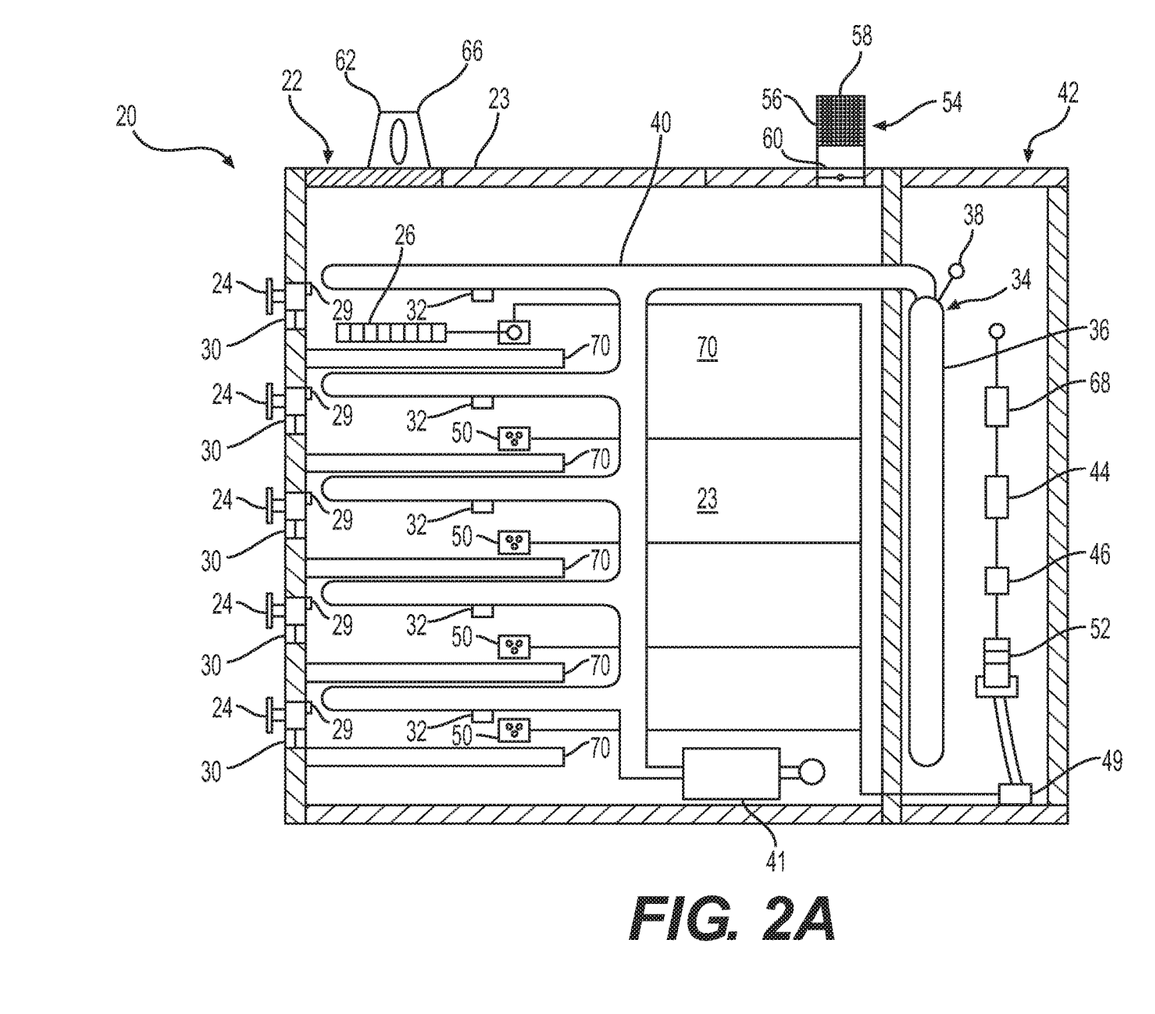
FIG. 2A is a cross-sectional side view of the system of FIG. 1 across plane A in accordance with aspects of the present disclosure.
Figure 2B:
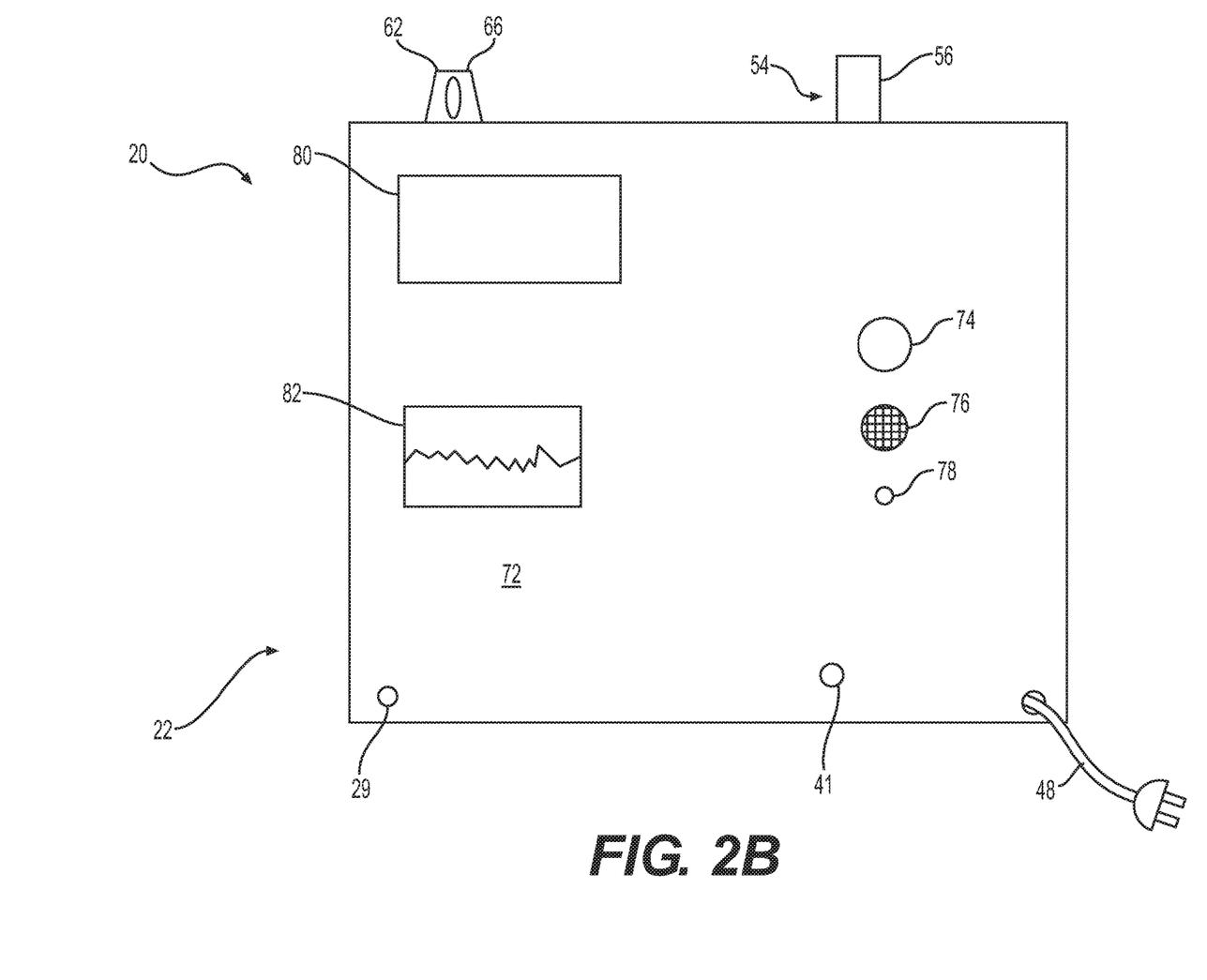
FIG. 2B is a side view of the system of FIG. 1 in accordance with aspects of the present disclosure.

As shown in FIGS. 1-2, a system 20 includes a housing unit 22. The housing unit 22 may be made from a fire retardant or fireproof material. For the purposes of this disclosure, the fire retardant and fireproof material can include steel, gypsum, a gypsum plaster, a cementitious plaster, perlite, or other desired materials. The housing unit 22 may be coated in a fire retardant or fireproof material, such as the gypsum plaster, the cementitious plaster, or any other desired fire retardant or fireproof materials. An interior of the housing unit 22 and any pass-throughs (for instance, for wiring) may be coated in an intumescent material (i.e., a coating or sealant that swells up when heated to protect the material underneath or seals a gap in the event of a thermal event). The thermal event can include outgassing from the hazardous product 26 (e.g., the presence of smoke methyl ethyl carbonate, acetone, styrene, benzene, hexane, butadiene, carbon monoxide, toluene, fluorotrimethylsilane, decane, and/or hydrogen gasses, the concentration of gasses may change leading up to or during the thermal event), an increase in temperature in the interior volume 23 of the housing unit 22 (e.g., higher than about 160° F.), an increase in air pressure the interior volume 23 of the housing unit 22, a fire, an explosion, or any other conditions. The top, a portion of the top, or any other desired section of the housing unit 22 may be configured to be a removable panel, such as a breakaway section 23. In the event of an explosion, the breakaway section 23 can separate from the housing unit 22 so that force and debris are directed through a hole left by the breakaway section 23. For example, the force of the thermal event and/or debris may be forced through the hole in a first direction, such as an upward direction.

One or more doors 24 can be coupled to the housing unit 22 to allow hazardous product 26 to be placed into an interior volume 23 of the housing unit 22. The interior volume includes the volume of space within the housing unit 22. The one or more door 24 can be made from a fire retardant or fireproof material. The one or more doors 24 can be coated in a fire retardant or fireproof material. Each of the one or more doors 28 may be self-closing, which may be accomplished by a gravity based solution (wherein the door 24 is connected to the housing unit 22 at a top portion of the door by a hinge), a spring based solution (wherein each door 24 is connected to the housing unit 22 via a hinge and a spring that biases the door 24 into a closed position), an actuated solution (in which a mechanical actuator closes the door 24), or any other desired closing solution.

Figure 3:
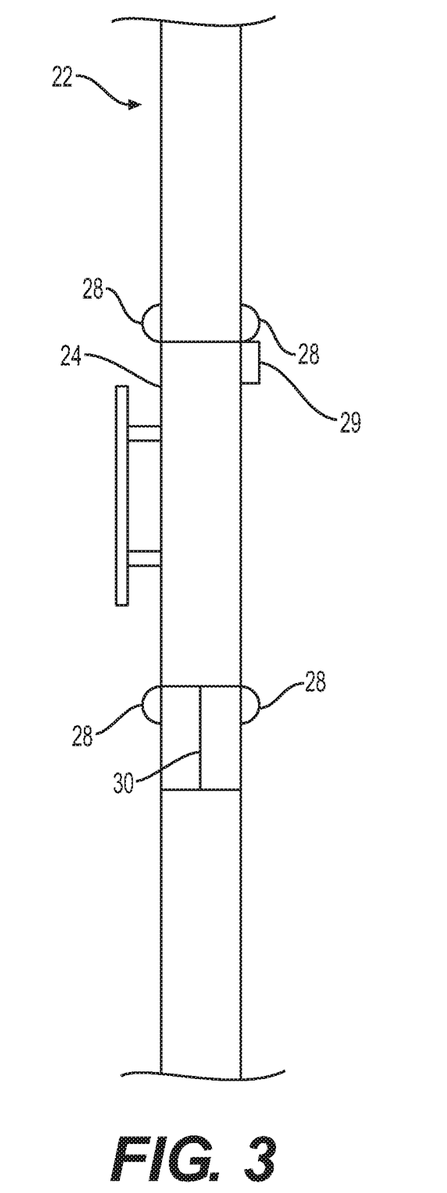
FIG. 3 is a cross-sectional view of a door of a housing unit in accordance with aspects of the present disclosure.

As shown in FIG. 3, each door 24 may be configured to form a seal with the housing in response to a thermal event. The seal can be formed by a first heat sensitive compound 28 (e.g., an intumescent compound) disposed adjacent the door 24 that, in response to heat generated by the thermal event, expands to prevent the door 24 from opening. In response to heat generated by the thermal event, the seal can be formed by a second heat sensitive compound 28 disposed adjacent the door 24 to adhesively couple the door 24 to the housing unit 22 to prevent the door 24 from opening. The seal can be formed by a solenoid 30 that actuates to lock the door 24 in a closed position in response to the thermal event. A spring encased in a heat sensitive plug (such as a wax with a melting point of about 120° F.) can be used to produce the seal. The heat sensitive plug prevents the spring from pushing the door 24 from an open position (e.g., a first position) to a closed position (e.g., a second position). The seal can be formed when the plug heats up, melts, and stops preventing the spring from pushing the door 24 from the open position to the closed position. The door can include a door sensor 27 for detecting the position of the door 24 (e.g., in a first position or second position) and sending a signal about the position of the door 24.

The housing unit 22 can include one or more attachment points 29. The one or more attachment points 29 can be configured to attach the housing unit 22 to a surface. For example, a cable can be tied to the attachment point 29 at a tie-down location on a deck of a vessel, such as a boat or a ship. The attachment point 29 can be configured to allow the housing unit 22 to be towed behind a boat or ship. For example, the cable can be tied to the attachment point 29 at the tie-down location on the deck or at a rear section of the vessel and towed behind the vessel, such as during and after a thermal event. The attachment point 29 can include a cable lock, a D-ring, or any desired attachment device.

The system 20 can include one or more sensors 32 for detecting the thermal event. The one or more sensors 32 can be at least one of the following sensors: a temperature sensor configured to detect an increase in temperature in the interior volume 23 of the housing unit 22, an air pressure sensor configured to detect an increase in air pressure in the interior volume of the housing unit 22, a smoke detector configured to detect smoke produced in the interior volume 23 of the housing unit 22, a thermal imaging device such as an infrared camera configured to detect heat in the interior volume 23 of the housing unit 22, a chemical detector configured to detect gas concentrations in the interior volume 23 of the housing unit 22, or any other desired sensor or device. The one or more sensors 32 may be in communication with the solenoid 30. For example, if the sensors 32 detect a thermal event, the solenoid 30 can lock the door 24 when the door 24 is in a closed position.

The system 20 can include a fire suppression system 34 configured to suppress the thermal event in the interior volume 23 of the housing unit 22. The fire suppression system 34 can include a reservoir 36. The reservoir 36 can contain or be configured to contain fire suppression materials or any other desired material. Fire suppression materials may include inert gasses (e.g., nitrogen, carbon dioxide, etc.), fluids (e.g., water), powders (e.g. Sodium bicarbonate, mono-ammonium phosphate, etc.), compounds (e.g., evaporating fluorocarbon), or any other dry chemicals or wet agents used for suppressing the thermal event. The reservoir 36 may include a reservoir sensor 38 configured to detect the amount of fire suppression material remaining in the reservoir 36. For example, the reservoir sensor 38 may be a pressure sensor configured to detect a pressure of gasses within the reservoir 36, a sensor configured to detect a liquid level within the reservoir 36, or any other desired sensor for detecting a fire suppression material level. One or more tubes, such as tubing 40, may be disposed along the top of the interior of the housing unit 22, along a wall of the housing unit 22, or any other desired location. The tubing 40 can be in fluid communication with the reservoir 36. The system 20 can include multiple reservoirs 36 disposed in the interior volume of the housing unit 22. The multiple reservoirs 36 can include the same or different fire suppression materials to be applied at the same time and/or different times. For example, a first fire suppression material from a first reservoir 36 can be applied toward a first thermal event during a first time period and a second fire suppression material from a second reservoir 36 can be applied toward the first thermal event during the first time period and/or during a second time period to function as a back-up in case the first reservoir 36 or any other component of the fire suppression system 34 fails. The first fire suppression material from the first reservoir 36 can be applied toward the first thermal event and the second fire suppression material from the second reservoir 36 can be applied toward a second thermal event.

The tubing 40 can contain fire suppression materials, for example, received from the reservoir 36. The tubing 40 can be configured to be pressurized to increase the flow of fire suppression materials out of the tubing 40, for example, to distribute the fire suppression materials toward the thermal event. The tubing 40 can be heat sensitive and configured to breach in response to an increase in temperature resulting from the thermal event in order to distribute the fire suppression materials from the reservoir 38 toward the thermal event. The tubing 40 can be configured to detach from the reservoir 38 without breaching to so that the reservoir 38 can be removed and replaced. The tubing 40 can have attachments, such as nozzles, to distribute the fire suppression materials.

The system 20 can further include a pump 41. The pump 41 can be operatively coupled to the housing unit 22. The pump 41 can be configured for pumping a fluid to the interior volume 23 of the housing unit 22. The pump 41 can be configured to attach to an external source of water, such as an external reservoir or, in the case of a boat or ship, an external body of water, such as a river, lake, sea, or ocean. The pump 41 can be in fluid communication with the tubing 40 for distributing the fluid through the tubing 40 and toward the thermal event.

A modular attachment 42 can be detachably coupled to the housing unit 22. The modular attachment 42 can be configured to allow for easy replacement and maintenance of elements of the system 20, such as the reservoir 36. For example, the reservoir 36 of the fire suppression system 34 can be coupled to a wall of the modular attachment 42. Connection points and seams between the modular attachment 42 and the rest of the system 20 can be coated with an intumescent material to prevent fire escape during the thermal event.

Figure 4:
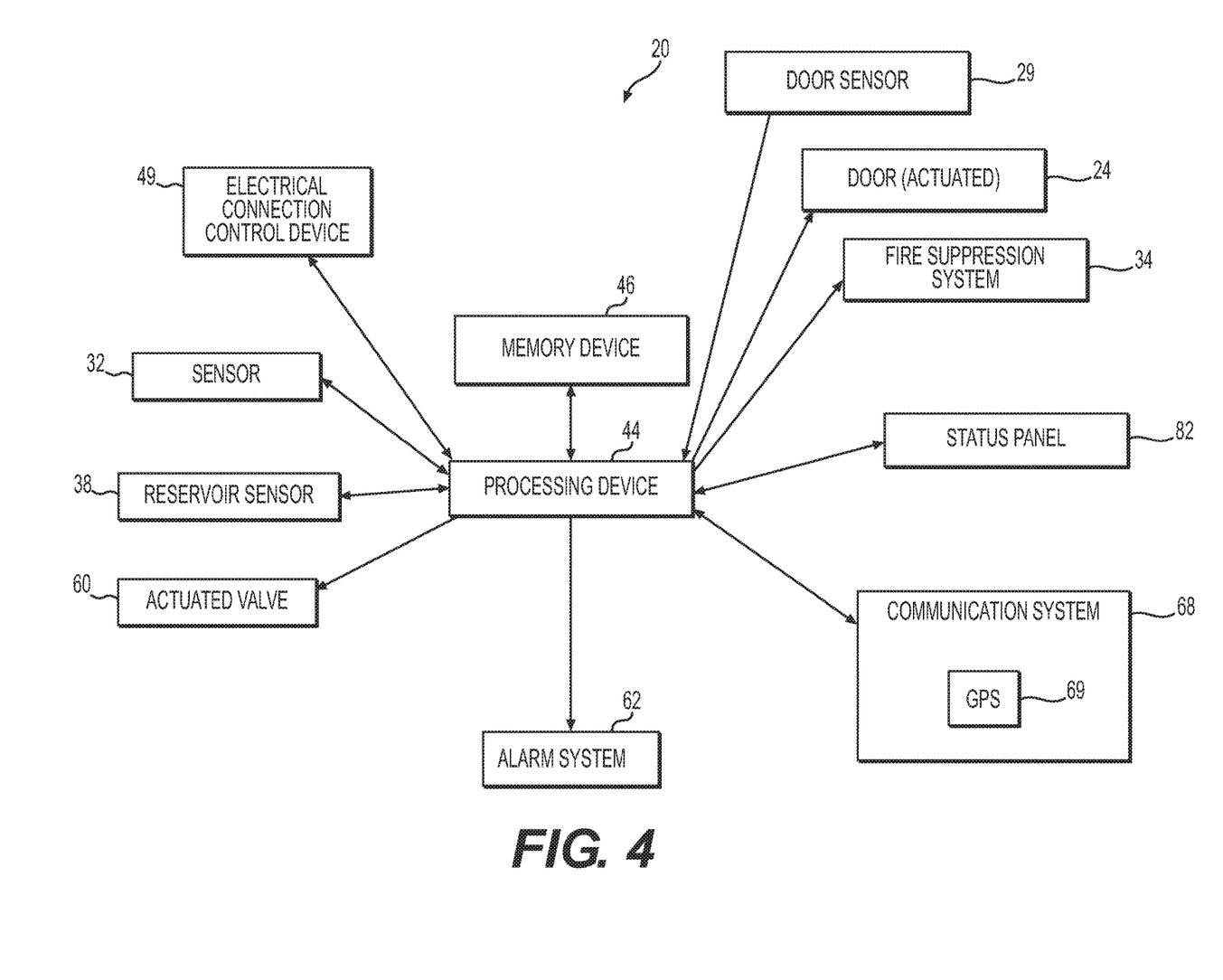
FIG. 4 is a schematic of electrical components of the system in accordance with aspects of the present disclosure.

As shown in FIG. 4, the system 20 can include a processing device 44, such as a processor, and a memory device 46. The term "processor" should be understood to include computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. The processing device 44 can be in communication with one or more of an actuated version of the door 24, the solenoid 30, the sensor 32, electronically controlled embodiments of the fire suppression system 34, the reservoir sensor 38, the memory device 46, any later discussed electronic device, or any other desired component or device. The memory device 46 should be understood to include a single disk or a plurality of disks (e.g., hard drives), a storage management module that manages one or more partitions within the memory, flash memory, semiconductor (solid state) memory, Random Access Memory (RAM), a Read-Only Memory (ROM), cloud storage, a combination thereof, or any other desired device. The memory device 46 can be configured to store information, such as thermal event information and GPS location information, and instructions executable by the processing device 44. The processing device 44 can be configured to send information to be stored by the memory device 46. The processing device 44 can be configured to receive information from components of the system 20. For example, the processing device 44 can be configured to receive one or more of the following information: the thermal event information from the sensor 32; the status (for instance, pressure) of the reservoir or quantity of fire suppression materials remaining in the reservoir from the reservoir sensor 38; positional information (e.g., open or closed) from actuated embodiments of the door 24, such as from the door sensor 27; or any other desired information. In response to the received information, the processing device 44 can be configured to execute instructions from the memory device 46. For example, in response to periods of inactivity while the door 24 is in an open position (as determined based on information from the door sensor 27) or in response to a determination of the thermal event, the processing device 44 can execute instructions to actuate the actuated components operatively coupled to the door 24 to close the door 24. The processing device 44 can be configured to determine, based on thermal event information, whether the thermal event has occurred. In response to a thermal event occurring, the processing device 44 can execute the instructions to activate systems or components of the system 20, as described in more detail throughout this disclosure.

The system 20 can include an electrical connection 48 configured to transmit electricity into or out of the interior volume. The electrical connection 48 can include a wired energy transmission connection or a wireless energy transmission connection. The system 20 can include an electrical connection control device 49 for enabling or disabling the electrical connection 48. The electrical connection control device 49 can be configured to disable the electrical connection 48 when the door 24 is in a first position (e.g. open) as determined by the processor based on information from the door sensor 27 and enable the electrical connection 48 when the door 24 is in a second position (e.g. closed) as determined by the processor based on information from the door sensor 27. The electrical connection control device 49 can be configured to disable the electrical connection 48 in response to the sensor 32 detecting the thermal event. The electrical connection 48 can be configured to provide electricity through wiring or a wireless electrical transfer device to various electrical components, such as actuated embodiments of the door 24, the solenoid 30, the sensor 32, electrically controlled embodiments of the fire suppression system 34, reservoir sensor 38, the processing device 44, the memory device 46, later discussed electrical devices, or any other desired electrical component or system.

The system 20 can include an electrical charging device 50 or any other desired charging device disposed within the interior volume of the housing unit 22. The electrical charging device 50 can be in conductive communication with the electrical connection 48. The electrical charging device 50 can be configured to charge the hazardous product 26. The electrical charging device 50 can be configured to transmit energy through a wired energy transmission connection, such as an electrical outlet, USB port, or other desired device. The electrical charging device 50 can be configured to transmit energy through a wireless energy transmission device. The electrical charging device 50 can be in communication with the processing device 44 to provide charging information (e.g., the amount of charge remaining of the high capacity battery) to the processing device 44. Based on the information received, processing device 44 may execute instructions to stop charging the high capacity battery (i.e., if the battery is fully charged), to continue charging the high capacity battery (i.e., if the battery is not fully charged), to display the charging information (e.g., via a signal to an external device, via a light coupled to the housing unit 22), or any other desired action.

The system can include a battery 52 for providing electricity through wiring or a wireless electrical transfer device to various electrical components, such as the sensor 32, the processing device 44, the memory device 46, or any other desired device. The battery 52 can be rechargeable. The battery 52 can be configured to provide electrical power to electrical components when external power is removed. The battery 52 can be configured to provide information such as battery charge remaining on the battery 52 to the processing device 44.

The system 20 can include a ventilation system 54. The ventilation system 54 can be configured to direct gasses and/or heat produced during the thermal event from in the interior volume 23 of the housing unit 22 to outside of the housing unit 22. The ventilation system 54 can includes a chute 56. The chute 56 can be made from and/or coated in fire retardant or fireproof material. The chute 56 can include a flame arrestor 58 for limiting the spread of the thermal event. The flame arrestor 58 can include wire mesh, sheet metal with punched holes, or any other desired flame arrestor devices. The ventilation system 54 can include an actuated valve 60 for controlling the release of gasses (e.g., methyl ethyl carbonate, acetone, styrene, benzene, hexane, butadiene, carbon monoxide, toluene, fluorotrimethylsilane, decane, etc.), smoke, and heat produced by the thermal event in the housing unit 22. The actuated value 60 can be a valve that is mechanically operated by a hydraulic, electric, or pneumatic actuator. The actuated valve 60 can be disposed within the chute 56. The actuated valve 60 can be operatively coupled to the processing device 44 and configured to open or close in response to a signal being received from the processing device 44. The ventilation system can also include a valve that is opened passively, that is, without controller signal. This passive method could be embodied similar to the seal of the door 24 wherein a heat sensitive plug would release the valve to allow hot gases to escape upon experiencing an increase in temperature.

The system 20 can include an alarm system 62. The alarm system 62 can be in communication with and responsive to the sensor 32 and/or the processing device 44. The alarm system 62 can be configured to provide audio and visual signals in response to the sensor 32 detecting the thermal event or the processing device 44 determining the presence of the thermal event and sending a signal for the alarm system to activate. For example, the audio signals can be provided through a speaker 64, a siren, or any other desired audio device. The audio signals made in response to the sensor 32 detecting the thermal event through the speaker 64 can provide informative and/or instructive statements such as "fire detected in battery container, please keep away," "outgassing detected in battery container, please keep away," or any other desired message. The visual signals can be provided by a rotating beacon 66 on top of the housing unit 22, a light coupled to the housing unit 22, or any other desired visual device.

The system 20 can include a communication system 68. The communication system 68 can be in communication with and responsive to the sensor 34. The communication system 68 can be configured to transmit a signal to an external device in response to the sensor detecting the thermal event. The communication system 68 can be in communication with the processing device 44. For example, the processing device 44 can, in response to determining the presence of the thermal event, instruct the communication system 68 to send the signal. The signal can be transmitted to an external device, such as to a smart phone, a tablet, a computer, or any other desired device, for example, via a text message, a voice message, an e-mail, an alert to an app, or any other desired communication. For example, the signal may be transmitted to send communication to an individual person, such as a person responsible for the system 20; to an emergency service center in order to alert personnel trained in fire suppression techniques; to a remote service company responsible for maintenance of the system 20, such as to allow the remote service to make a decision as to whether summoning emergency services is warranted, or any other desired person, company, or service center. The communication system 68 can include a Wi-Fi transmitter and/or receiver; a 3G, 4G, or 5G wireless device; a radio device; or any other desired device. The communication system 68 can include a Global Positioning System (GPS) 69. The GPS 69 can be configured to track the location of the system 20 and communicate with the communication system 68 to provide its location. The radio device can be configured to transmit a mayday signal, for example, on channel 16. The radio device can be configured to transmit GPS information, thermal event information, or any other desired information. A GPS and thermal event information can help responder services locate the thermal event and understand the severity of the thermal event that they are responding to.

A dividing wall 70 can be disposed within the interior volume of the housing unit 22. The dividing wall 70 can divide the housing unit 22 into sections (e.g., compartments) to contain the thermal event. The sections can be self-containing individual compartments 71, such as a first individual compartment, a second individual compartment, or any other desired individual compartments. The individual compartments 71 can be configured to contain the spread of fire caused from the thermal event (i.e., containing the fire to the specific section(s) of the housing unit 22 to prevent the fire from spreading to additional section(s) of the housing unit 22). At least one sensor 32 can be operatively coupled to each section. Each section can have its own associated fire suppression system 34. For example, in response to a thermal event being detected by the sensor 32 in a single section, the fire suppression system 34 can be configured to provide fire suppressant materials to that specific section. Distributing the fire suppressant material toward the thermal event located in specific sections and/or individual compartments 71 can, for example, reduce the quantity of fire suppression material used to suppress the thermal event, increase the efficiency of the fire suppression system 34, and/or reduce and/or eliminate damage to hazardous products disposed in other sections and/or individual compartments 71 in the interior volume 23 of the housing unit 22. For a housing unit 22 with multiple sections, each section can have its own associated electrical charging device 50 its own associated door 24, or any other system, device, or component.

As shown in FIG. 2B, the system 20 can include a responder access panel 72. The responder access panel can be coupled to or formed as a portion of the housing unit 22. The responder access panel 72 can include a fire suppressant port 74 for receiving fire suppressant material, for example, in the form of a liquid or a gas. The responder access panel 72 can include a venting port 76 configured to selectively release gasses and heat produced by the thermal event. The venting port 76 can include a flame arrestor 58. The responder access panel 72 can include a sensor port 78 for allowing responders to insert additional sensors to allow for further monitoring of the interior of the housing unit 22. For instance, the sensor port 81 may include a one-way hatch that allows a firefighter to insert an additional sensor that provides a additional information (for example, first responders, such as firefighters, if the detection of smoke is desired and the system 20 does not include a smoke detector, the additional sensor may be a smoke detector). The responder access panel 72 can include a viewing portal 80. The viewing portal 82 can include a transparent material configured for a person, such as a first responder, to see through to visually inspect the thermal event in the interior volume 23 of the housing unit 22. For example, a person can view the thermal event through the viewing portal 80 to inspect the status of the thermal event, such as a progress of the suppression of the thermal event. The responder access panel 72 can include a status panel 82 for displaying internal status information for the housing unit 22 received from the sensor(s) 34. The internal status information can include temperature, pressure, gasses, a presence of the thermal event, a presence of a fire, a status of the suppression of the thermal event, the length of time of the thermal event, or any other desired information detected from in the interior volume 23 of the housing unit 22, the section, the individual compartment 71. The status panel 82 can be a display, a touch screen, or any other desired device configured to display information and/or inputs and to receive a selection of information. For example, the status panel 82 can include inputs for a user to select the type of information for viewing on the display. The responder access panel 72 can include an option for activating, deactivating, or changing actions of the system 20 or any systems, device, or components operatively coupled to the system 20.

FIG. 4 shows exemplary electrical components of the system 20 in communication with each other. The processing device 44 can be in communication with one or more of the following: an actuated version of the door 24; the door sensor 29; the sensor 32; the fire suppression system 34; the reservoir sensor 38; the memory device 46; the electrical connection 48; the electrical charging device 50; the battery 52; the actuated valve 60; the alarm system 62, including with the speaker 64 and the rotating beacon 66; the communication system 68, and the status panel 84.

Figure 5:
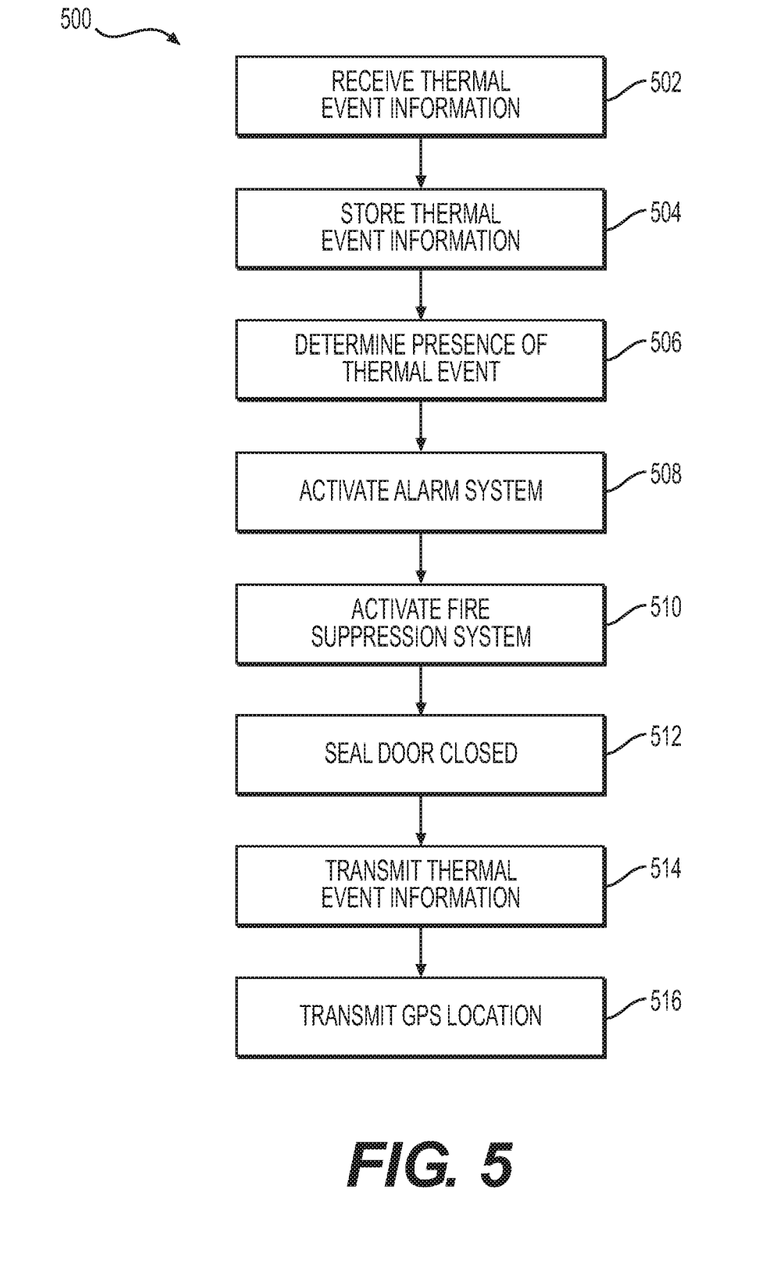
FIG. 5 illustrates a method in accordance with aspects of the present disclosure.

FIG. 5 illustrates a method 500 for operating an embodiment of the system 20. To execute the instructions for method 500, the processing device 44 is operatively coupled to one or more of the following: the memory device 46 for storing the instructions and information, the sensor 32 for detecting the thermal event, the alarm system 62 for producing the alarm, the communication system 68 for transmitting thermal event information and GPS location information to a remote device, and the fire suppression system 34 for suppressing the thermal event.

At step 502, the method 500 can include receiving thermal event information from the sensor 32. For example, the sensor 32 can transmit—and the processing device 44 can receive—the thermal event information, such as temperature, pressure, gas concentrations, presence of smoke, or other desired thermal event information detected from the interior volume 23 of the housing unit 22, the section, and/or the individual compartment 71.

At step 504, the method 500 can include storing the thermal event information in the memory device 46. For example, the processing devices 44 can transmit- and the memory device 46 can receive and store—the thermal event information.

At step 506, the method 500 can include determining the presence of a thermal event based on the thermal event information. For example, the processing device 44 can compare the thermal event information with information previously detected in the interior volume 23 of the housing unit 22, such as information detected prior to the thermal event, and thermal event information to determine whether the thermal event information has exceeded a threshold that may indicate the presence of a thermal event (e.g., a temperature sensor shows a sharp increase in temperature from 72° F. to 118° F., or any other indicative temperature change).

At step 508, the method 500 can include activating the alarm system 62 in response to the thermal event. For example, the processing device 44 can send a signal to the speaker 64 to output a sound, such as "fire detected in battery container, please keep away," and/or a signal to activate the rotating beacon 66.

At step 510, the method 500 can include activating the fire suppression system 234 in response to the thermal event. For example, the processing device 44 can send a signal to the fire suppression system 34 to release the fire suppressant material through the tubing and toward the thermal event.

At step 512, the method 500 can include sealing the door 24 in a closed position in response to the thermal event. For example, the processing device 44 can send a signal to the solenoid 30 to seal the door when the door is in the closed position.

At step 514, the method 500 can include transmitting, via the communication system 68, the thermal event information. For example, the processing device 44 can send a signal to the radio device of the communication system 68 to transmit the thermal event information to an external device. For example, the external device could be a computer at a coast guard response unit, and the thermal event information can help the coast guard response unit determine the status of the thermal event in case additional measures are needed to suppress the event.

At step 516, the method 500 can include transmitting, via the communication system 68, GPS location information. For example, the processing device 44 can send a signal to the radio device to transmit coordinates identified by the GPS system 69. For example, the external device could be a computer at a coast guard response unit, and the GPS location information could allow the coast guard response unit to more easily locate the system 20 in order to apply additional measures to suppress the thermal event.

Figure 6:
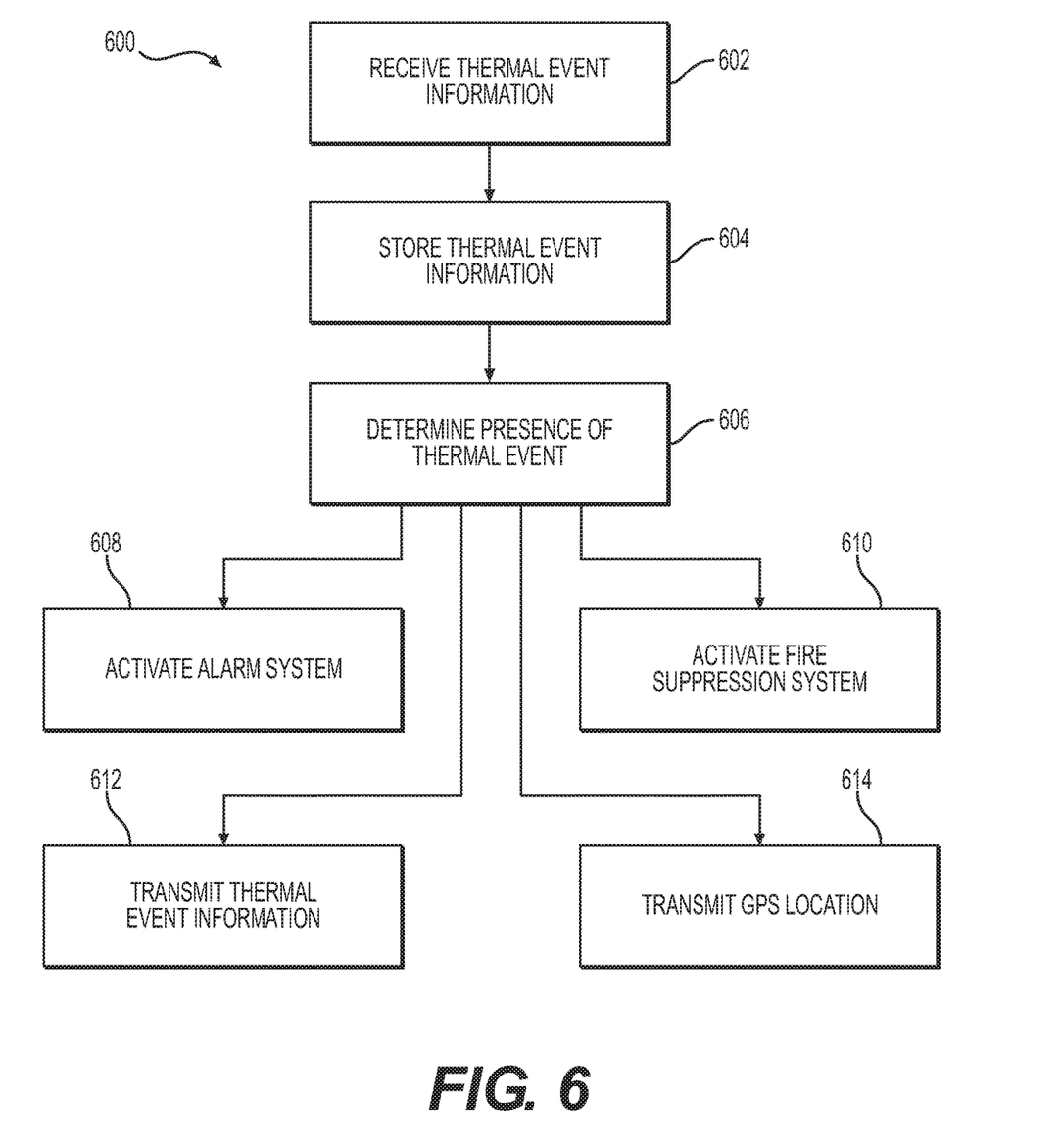
FIG. 6 illustrates a method in accordance with aspects of the present disclosure.

FIG. 6 illustrates a method 600 for operating an embodiment of the system 20. To execute the instructions for the method 600, the processing device 44 is operatively coupled to one or more of the following: the memory device 46 for storing information and instructions for the processing device 44 to execute, the sensor 32 for detecting the thermal event, the alarm system 62 for producing the alarm, the communication system 68 for transmitting thermal event information and GPS location information, and the fire suppression system 34 for suppressing the thermal event.

At step 602, the method 600 can include receiving thermal event information from the sensor 32. For example, the sensor 32 can transmit- and the processing device 44 can receive—the thermal event information, such as temperature, pressure, gas concentrations, presence of smoke, or other desired thermal event information.

At step 604, the method 600 can include storing the thermal event information in the memory device 46. For example, the processing devices 44 can transmit- and the memory device 46 can receive and store—the thermal event information.

At step 606, method 600 can include determining the presence of a thermal event based on the thermal event information. For example, the processing device 44 can compare the thermal event information with information previously detected in the interior volume 23 of the housing unit 22, such as information detected prior to the thermal event, and thermal event information, to determine whether the thermal event information has exceeded a threshold that may indicate the presence of a thermal event (e.g., a temperature sensor shows a sharp increase in temperature from about 72° F. to 118° F., or any other indicative temperature range).

At step 608, the method 600 can include activating the alarm system 62 in response to the thermal event. For example, the processing device 44 can send a signal to the speaker 64 to output a sound, such as "fire detected in battery container, please keep away," and/or a signal to activate the rotating beacon 66.

At step 610, the method 600 can include activating the fire suppression system 34 in response to the thermal event. For example, the processing device 44 can send a signal to the fire suppression system 34 to release the fire suppressant material through the tubing 40 and toward the thermal event.

At step 612, the method 600 can include transmitting, via the communication system 68, the thermal event information. For example, the processing device 44 can send a signal to the radio device to transmit the thermal event information to an external device. For example, the external device could be a computer at a coast guard response unit, and the thermal event information can help the coast guard response unit determine the status of the thermal event in case additional measures are needed to suppress the event.

At step 614, the method 600 can include transmitting, via the communication system 68, GPS location information. For example, the processing device 44 can send a signal to the radio device to transmit coordinates identified by the GPS system. For example, the external device could be a computer at a coast guard response unit, and the GPS location information could allow the coast guard response unit to more easily locate the system 20 in order to apply additional measures to suppress the thermal event.

The following clauses disclose embodiments of the disclosure.

Clause 1. A system for storing a hazardous product, comprising:
a housing unit having an interior volume;
one or more doors coupled to the housing unit for providing access to the interior volume;
an electrical connection configured to transmit electricity into or out of the interior volume; and
a ventilation system for directing gasses and heat produced during a thermal event out of the interior volume.

Clause 2. The system of any preceding clause, further comprising:
a sensor for detecting the thermal event; and
a device configured to seal the one or more doors in response to the sensor detecting the thermal event.

Clause 3. The system of any preceding clause, further comprising:
a sensor for detecting the thermal event; and
an alarm system operatively coupled to the sensor and configured to provide an alarm in response to the sensor detecting the thermal event.

Clause 4. The system of any preceding clause, further comprising:
a sensor for detecting the thermal event; and
a communication system in operatively coupled to the sensor and configured to transmit a signal in response to the sensor detecting the thermal event.

Clause 5. The system of any preceding clause, further comprising:

an electrical connection control device for enabling or disabling the electrical connection;

a memory device for storing instructions and information;

a sensor, an alarm system, a communication system having a GPS, and a fire suppression device operatively connected to the housing unit; and a processing device operatively coupled to the sensor, the memory device, the alarm system, the communication system, and the fire suppression device, wherein the processing device is configured to execute the instructions to:

receive thermal event information from the sensor;

store the thermal event information in the memory device;

determine the thermal event based on the thermal event information;

activate the alarm system in response to the thermal event;

activate the fire suppression device in response to the thermal event;

transmit, via the communication system, the thermal event information and a GPS location; and disable the electrical connection.

Clause 6. The system of any preceding clause, further comprising:

a fire suppression system configured for suppressing the thermal event in the housing unit, wherein the fire suppression system includes a reservoir containing fire suppression materials and tubing disposed in the housing unit and in fluid communication with the reservoir.

Clause 7. The system of any preceding clause, wherein the tubing is configured to receive fire suppression materials from the reservoir and, in response to an increase in temperature resulting from the thermal event, the tubing breaches to distribute the fire suppression materials toward the thermal event.

Clause 8. The system of any preceding clause, further comprising:

a modular attachment detachably coupled to the housing unit, wherein the reservoir of the fire suppression system is coupled to the modular attachment and the tubing is configured to detach from the reservoir.

Clause 9. The system of any preceding clause, further comprising:

an electrical charging device disposed in the interior volume of the housing unit and in conductive communication with the electrical connection;

wherein the electrical charging device charges the hazardous product.

Clause 10. The system of any preceding clause, further comprising:

a dividing wall separating the interior volume of the housing unit into first and second individual compartments;

wherein the one or more doors includes a first door for the first individual compartment and a second door for the second individual compartment.

Clause 11. The system of any preceding clause, further comprising:

the housing unit including a removable panel for directing a force of the thermal event in a first direction.

Clause 12. The system of any preceding clause, further comprising:

a pump operatively coupled to the housing unit for pumping a fluid to the interior volume of the housing unit.

Clause 13. The system of any preceding clause, further comprising:

an attachment point connected to the housing unit, wherein the attachment point is configured to attach directly or indirectly to a surface to prevent movement or to a tow cable to allow for the system to be towed behind a boat or ship in a marine environment.

Clause 14. The system of any preceding clause, further comprising:

an electrical connection control device for enabling or disabling the electrical connection; and a sensor operatively coupled to the electrical connection control device for detecting the thermal event;

wherein, responsive to the sensor detecting the thermal event, the electrical connection control device disables the electrical connection.

Clause 15. The system of any preceding clause, further comprising:

an electrical connection control device for enabling or disabling the electrical connection; and a door sensor operatively connected to the electrical connection control device;

wherein the electrical connection control device is configured to disable the electrical connection when the door sensor detects the door in a first position and to enable the electrical connection when the door sensor detects the door in a second position.

Clause 16. The system of any preceding clause, further comprising:

a responder access panel coupled to the housing unit, the responder access panel further comprising:

a fire suppressant port for receiving at least one fluid chosen from a liquid, a fire suppressant, and an inert gas;

a venting port configured for controlling a release of gasses and heat produced by the thermal event;

a viewing portal configured for visual inspection of the thermal event; and a status panel for displaying internal status information of the housing unit.

Clause 17. A system for storing a hazardous product, comprising:

a housing unit having an interior volume;

a door coupled to the housing unit configured for providing access to the interior volume of the housing unit;

an electrical connection configured for transmitting electricity into or out of the interior volume;

a ventilation system configured for directing gasses and heat produced during a thermal event from the interior volume of the housing unit to outside the housing unit;

a fire suppression system configured for suppressing the thermal event in the interior volume of the housing unit, wherein the fire suppression system includes a reservoir containing fire suppression materials and tubing disposed along an interior wall of the housing unit and in fluid communication with the reservoir;

a sensor for detecting the thermal event; and an alarm system in operatively coupled to the sensor that, in response to detection of the thermal event, is configured to provide an alarm.

Clause 18. The system of any preceding clause, further comprising:

a communication system operatively coupled to the sensor that, in response to the sensor detecting the thermal event, is configured to transmit a signal.

Clause 19. The system of any preceding clause, further comprising:

an electrical charging device disposed in the interior volume of the housing unit and in conductive communication with the electrical connection, wherein the electrical charging device is configured to charge the hazardous product.

Clause 20. A system for storing a hazardous product, comprising:

a housing unit for receiving the hazardous product;

an electrical connection configured to transmit electricity into or out of the interior volume; an electrical connection control device configured to enable and disable the electrical connection;

a memory device for storing instructions and information;

a sensor, an alarm system, a communication system having a GPS, and a fire suppression device operatively coupled to the housing unit; and a processing device operatively coupled to the sensor, the memory device, the alarm system, the communication system, and the fire suppression device, wherein the processing device is configured to execute the instructions to:

receive thermal event information from the sensor;

store the thermal event information in the memory device;

determine a thermal event based on the thermal event information;

activate the alarm system in response to the thermal event;

activate the fire suppression device in response to the thermal event; and transmit, via the communication system, the thermal event information and a GPS location of the housing unit; and disable the electrical connection.

No part of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

The foregoing description, for purposes of explanation, use specific nomenclature to provide a thorough understanding of the described embodiments. However, it should be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It should be apparent to one of ordinary skill in the art that many modifications and variations are possible in view of the above teachings.

The above discussion is meant to be illustrative of the principles and various embodiments of the present invention. Once the above disclosure is fully appreciated, numerous variations and modifications will become apparent to those skilled in the art. It is intended that the following claims be interpreted to embrace all such variations and modifications.

What is claimed is:

1. A system comprising:

a housing unit having an interior volume;

one or more doors coupled to the housing unit for providing access to the interior volume;

an electrical connection configured to transmit electricity one or both of into or out of the interior volume one or both of to or from multiple batteries received through the one or more doors and contained in the interior volume;

a ventilation system for directing gasses and heat produced during a thermal event out of the interior volume, the thermal event being associated with one of the multiple batteries;

a sensor for detecting the thermal event; and a processing device configured to receive thermal event information from the sensor and determine whether the thermal event has occurred according to the thermal event information, the processing device being further configured to, in response to determining that the thermal event has occurred, cause one or more of an alarm system to provide an alarm or a communication system to transmit a signal to an external device.

2. The system of claim 1, further comprising:

a device configured to seal the one or more doors in response to the processing device determining that the thermal event has occurred.

3. The system of claim 1, further comprising:

the alarm system.

4. The system of claim 1, further comprising:

the communication system.

5. A system comprising:

a housing unit having an interior volume;

one or more doors coupled to the housing unit for providing access to the interior volume;

an electrical connection configured to transmit electricity one or both of into or out of the interior volume;

a ventilation system for directing gasses and heat produced during a thermal event out of the interior volume; and a processing device operatively coupled to a sensor, a memory device, an alarm system, a communication system, and a fire suppression device, wherein the processing device is configured to execute instructions to:

receive thermal event information from the sensor;

store the thermal event information in the memory device;

determine the thermal event based on the thermal event information;

activate the alarm system in response to the thermal event;

activate the fire suppression device in response to the thermal event;

transmit, via the communication system, the thermal event information and a GPS location; and disable the electrical connection.

6. The system of claim 1, further comprising:

a fire suppression system configured for suppressing the thermal event in the housing unit, wherein the fire suppression system includes a reservoir containing fire suppression materials and tubing disposed in the housing unit and in fluid communication with the reservoir.

7. The system of claim 6, wherein the tubing is configured to receive the fire suppression materials from the reservoir and, in response to an increase in temperature resulting from the thermal event, the tubing breaches to distribute the fire suppression materials toward the thermal event.

8. The system of claim 6, further comprising:

a modular attachment detachably coupled to the housing unit, wherein the reservoir of the fire suppression system is coupled to the modular attachment and the tubing is configured to detach from the reservoir.

9. The system of claim 1, further comprising:

electrical charging devices disposed in the interior volume of the housing unit and in conductive communication with the electrical connection, each of the electrical charging devices being configured to transmit the electricity to at least one of the multiple batteries.

10. The system of claim 1, further comprising:

a dividing wall separating the interior volume of the housing unit into first and second individual compartments configured to receive and contain therein one or more of the multiple batteries;

wherein the one or more doors includes a first door for the first individual compartment and a second door for the second individual compartment.

11. The system of claim 1, wherein the housing unit includes a removable panel for directing a force of the thermal event in a first direction.

12. The system of claim 1, further comprising:
a pump operatively coupled to the housing unit for pumping a fluid to the interior volume of the housing unit.

13. The system of claim 1, further comprising:
an attachment point connected to the housing unit, wherein the attachment point is configured to attach directly or indirectly to a surface to prevent movement or to a tow cable to allow for the system to be towed behind a boat or ship in a marine environment.

14. The system of claim 1, further comprising:
an electrical connection control device for one or both of enabling or disabling the electrical connection;
wherein the sensor is operatively coupled to the electrical connection control device for detecting the thermal event; and
wherein, responsive to determining that the thermal event has occurred, the electrical connection control device disables the electrical connection.

15. A system for storing hazardous products comprising:
a housing unit having an interior volume;
one or more doors coupled to the housing unit for providing access to the interior volume;
an electrical connection configured to transmit electricity one or both of into or out of the interior volume;
a ventilation system for directing gasses and heat produced during a thermal event out of the interior volume;
an electrical connection control device for enabling or disabling the electrical connection; and
a door sensor operatively connected to the electrical connection control device;
wherein the electrical connection control device is configured to disable the electrical connection when the door sensor detects at least one of the one or more doors in a first position and to enable the electrical connection when the door sensor detects the at least one of the one or more doors in a second position.

16. The system of claim 1, further comprising:
a responder access panel coupled to the housing unit, the responder access panel further comprising:
a fire suppressant port for receiving at least one fluid chosen from a liquid, a fire suppressant, and an inert gas;
a venting port configured for controlling a release of gasses and heat produced by the thermal event;
a viewing portal configured for visual inspection of the thermal event; and a status panel for displaying internal status information of the housing unit.

17. A system comprising:
a housing unit having an interior volume;
a door coupled to the housing unit configured for providing access to the interior volume of the housing unit;
an electrical connection configured for transmitting electricity one or both of into or out of the interior volume one of to or from multiple batteries contained in the interior volume;
a ventilation system configured for directing gasses and heat produced during a thermal event from the interior volume of the housing unit to outside the housing unit, the thermal event being associated with one of the multiple batteries;
a fire suppression system configured for suppressing the thermal event in the interior volume of the housing unit, wherein the fire suppression system includes a reservoir containing fire suppression materials and tubing disposed along an interior wall of the housing unit and in fluid communication with the reservoir;
a sensor for detecting the thermal event;
an alarm system configured to provide an alarm; and
a processing device configured to receive thermal event information from the sensor, determine whether the thermal event has occurred according to the thermal event information, and cause the alarm to provide the alarm in response to determining that the thermal event has occurred.

18. The system of claim 17, further comprising:
a communication system, in response to the processing device determining that the thermal event has occurred, is configured to transmit a signal.

19. The system of claim 17, further comprising:
an electrical charging device disposed in the interior volume of the housing unit and in conductive communication with the electrical connection, wherein the electrical charging device is configured to charge one or more of the multiple batteries.

20. A system for storing a hazardous product, comprising:
a housing unit having an interior volume for receiving the hazardous product;
an electrical connection configured to transmit electricity into or out of the interior volume;
an electrical connection control device configured to enable and disable the electrical connection;
a memory device for storing instructions and information;
a sensor, an alarm system, a communication system having a GPS, and a fire suppression device operatively coupled to the housing unit; and
a processing device operatively coupled to the sensor, the memory device, the alarm system, the communication system, and the fire suppression device, wherein the processing device is configured to execute the instructions to:
receive thermal event information from the sensor;
store the thermal event information in the memory device;
determine a thermal event based on the thermal event information;
activate the alarm system in response to the thermal event;
activate the fire suppression device in response to the thermal event;
transmit, via the communication system, the thermal event information and a GPS location of the housing unit; and
disable the electrical connection.

21. The system of claim 1, wherein the ventilation system further includes an actuated valve operable to open or close the ventilation system to control release of the gasses, and the processing device is configured to operate the actuated valve in response to determining that the thermal event has occurred.

22. The system of claim 3, further comprising the communication system.

23. The system of claim 5, further comprising:
an electrical connection control device for enabling or disabling the electrical connection;

the memory device for storing the instructions and information; and the sensor, the alarm system, the communication system having a GPS, and the fire suppression device operatively connected to the housing unit.

24. The system of claim 15, wherein the interior volume is configured to receive and contain therein the hazardous products and transmit the electricity between the electrical connection and the hazardous products, the hazardous products being batteries.

25. The system of claim 24, further comprising one or more electrical charging devices disposed in the interior volume of the housing unit and in conductive communication with the electrical connection, each of the one or more electrical charging devices being configured to transmit the electricity to at least one of the batteries.

* * * * *